United States Patent [19]

Kinney, Jr.

[11] 4,040,824
[45] Aug. 9, 1977

[54] DUAL PATH DRIFT ELIMINATOR STRUCTURE AND METHOD FOR CROSSFLOW COOLING TOWER

[75] Inventor: Ohler L. Kinney, Jr., Leawood, Kans.

[73] Assignee: The Marley Company, Mission, Kans.

[21] Appl. No.: 724,417

[22] Filed: Sept. 20, 1976

Related U.S. Application Data

[63] Continuation-in-part of Ser. No. 526,848, Nov. 25, 1974, abandoned.

[51] Int. Cl.$^2$ .................................. B01D 47/00
[52] U.S. Cl. ........................... 55/257 R; 261/112; 261/DIG. 11
[58] Field of Search ............... 261/111, 112, DIG. 11; 55/257 R, 257 C, 257 QV, 257 PV, 257 MP, 257 PP, 257 HE, 440–442, 259

[56] References Cited

U.S. PATENT DOCUMENTS

| | | | |
|---|---|---|---|
| 2,892,509 | 6/1959 | Baker et al. | 55/257 R |
| 3,065,587 | 11/1962 | Fordyce et al. | 55/442 |
| 3,226,098 | 12/1965 | Shryock | 55/440 X |
| 3,265,550 | 8/1966 | Lindqvist | 261/112 X |
| 3,500,615 | 3/1970 | Meek | 261/112 X |
| 3,647,191 | 3/1972 | Fordyce | 261/111 |
| 3,702,527 | 11/1972 | Frew | 55/440 |
| 3,748,832 | 7/1973 | Furlong et al. | 261/DIG. 11 |
| 3,764,121 | 10/1973 | Fordyce | 261/111 |
| 3,846,519 | 11/1974 | Spangemacher | 261/DIG. 11 |

FOREIGN PATENT DOCUMENTS

| | | | |
|---|---|---|---|
| 1,221,564 | 2/1971 | United Kingdom | 55/440 |

OTHER PUBLICATIONS

Hawley, G. G., *The Condensed Chemical Dictionary*, 8th Edition, Copyright 1971, New York, p. 611.

Primary Examiner—Tim R. Miles
Assistant Examiner—Richard L. Chiesa
Attorney, Agent, or Firm—Schmidt, Johnson, Hovey & Williams

[57] ABSTRACT

A dual path drift eliminator and method is provided which effectively removes entrained water particles from high velocity moist airstreams leaving a crossflow cooling tower fill structure by the use of spaced, cellular, individually draining, diversion path-defining structures strategically located and arranged to facilitate maximum drift elimination. The drift eliminator has a plurality of elongated air passages therein disposed to first divide the moist air from the tower fill into a series of separate streams which are first diverted at an upward angle relative to the initial path thereof, and thereafter rediverted laterally to one side of the first diversion path. Water particle removal is thus greatly enhanced by virtue of increased impingement of the entrained particles against the cellular walls defining the respective diversion paths. The eliminators hereof have special advantages in crossflow cooling towers because the spacing between the diversion path defining cellular structures permits separate draining of the water collected in each, so that air inlet blockage resulting from the accumulated drainage of large volumes of water from a single drainage area is avoided. The eliminator structure preferably includes a number of juxtaposed pairs of spaced, elongated, transversely corrugated, preformed sections sandwiched between elongated, preformed, transversely V-shaped panels to define a structurally distinct eliminator pack which can be manufactured using assembly line techniques; such packs are moreover of nestable configuration permitting complemental positioning of a plurality of packs to present a substantially continuous drift eliminator unit free of objectionable vertical gaps, notwithstanding the lack of conventional shiplap joints or other mechanical interconnection between individual eliminator packs.

19 Claims, 12 Drawing Figures

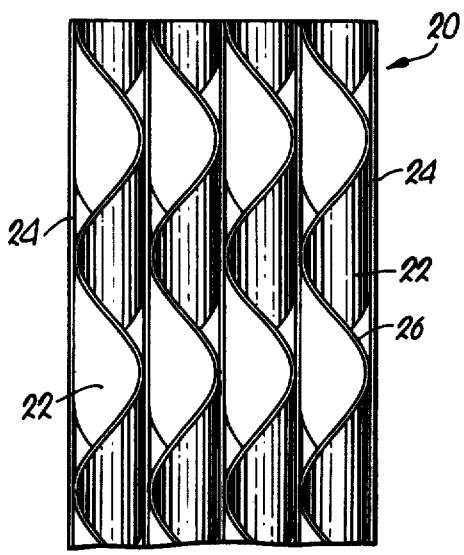
Fig.4.
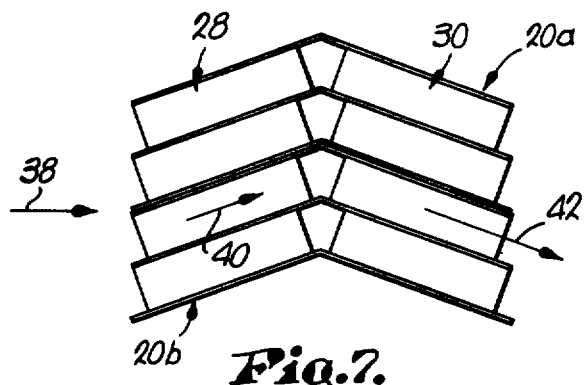
Fig.7.
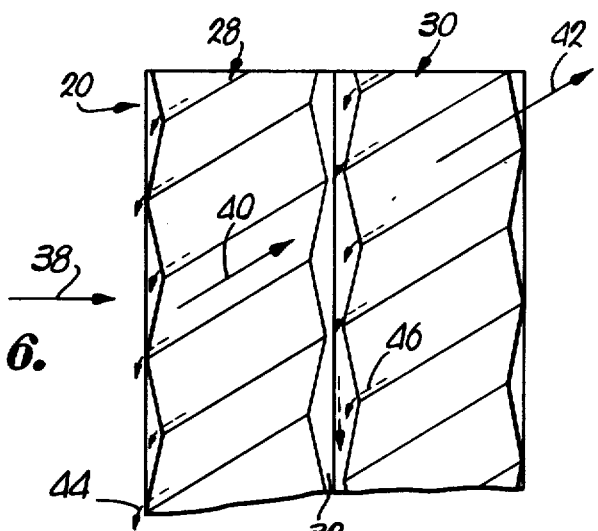
Fig.6.
Fig.8.
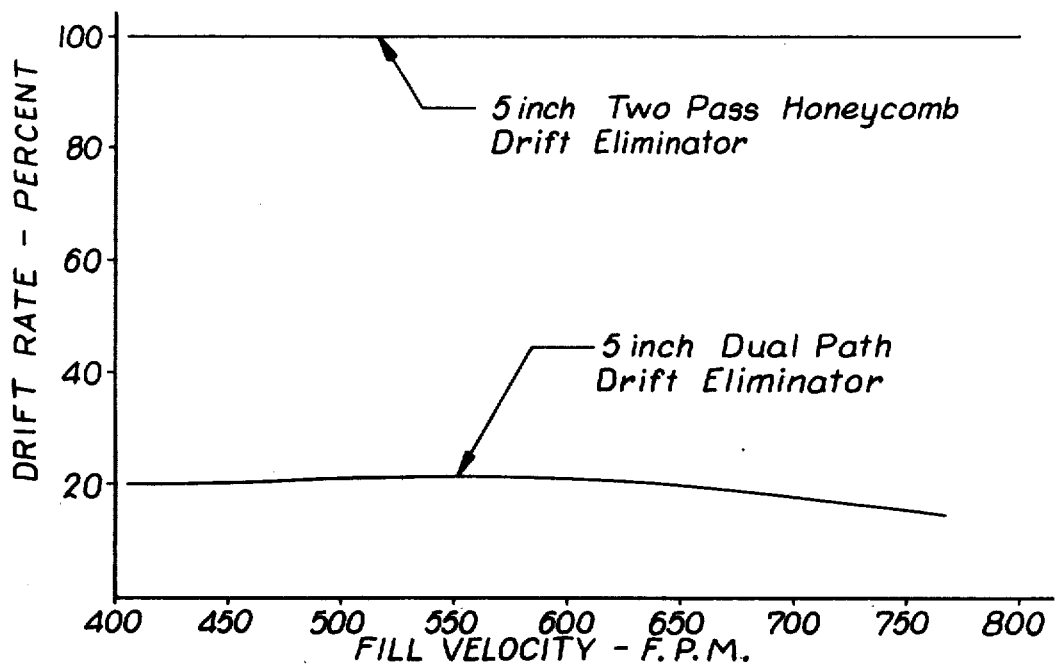

DUAL PATH DRIFT ELIMINATOR STRUCTURE AND METHOD FOR CROSSFLOW COOLING TOWER

This is a continuation-in-part of application Ser. No. 526,848 filed Nov. 25, 1974 now abandoned.

This invention relates to crossflow water cooling towers and especially improved drift eliminator constructions and methods for effectively removing entrained water particles from generally horizontally directed air currents leaving the tower fill structure. More particularly, it is concerned with such eliminators and methods wherein the moist airstreams are diverted at a first angle upwardly relative to the initial path thereof, and thereafter again diverted along a second diversion path situated laterally of the first path in order to greatly enhance removal of entrained water particles; in addition, the construction of the eliminator allows individual water drainage from the respective diversion paths, so that troublesome water blockage of the eliminator is avoided.

In evaporative water cooling towers of the crossflow variety heat is removed from initially hot water by causing the latter to gravitate through a surface-increasing fill assembly in crossflowing intersecting relationship to currents of cool air directed through the fill. Drift eliminators are usually provided to remove entrained droplets or particles from the air leaving the tower fill structure. If drift eliminator structures are not employed in such towers, substantial quantities of water can be discharged into the atmosphere. This results in undesirable operating conditions leading to excessive wetting of surrounding areas and corresponding coating thereof with mineral deposits. In addition, icing of adjacent equipment and structures can readily occur during wintertime operations. Thus, adequate drift elimination is very necessary with evaporative type cooling towers, especially when large towers are used in metropolitan areas or as part of a large industrial complex where cold weather occurs.

One type of drift eliminator for water cooling towers which has been used successfully for a number of years is depicted and described in U.S. Pat. No. 2,892,509. The Herringbone drift eliminator of this patent utilizes a number of wooden slats which are both transversely and longitudinally inclined for deflecting the air from the fill assembly upwardly at an angle to effect removal of water droplets therefrom as the particles of moisture impinge upon the double inclined surfaces of the eliminator slats. More effective removal of entrained water from the airstream is accomplished by providing a double pass of eliminator slats with the first layer being disposed with the longitudinal axis thereof inclined in one direction, while the next layer is longitudinally inclined in the opposite direction. Although highly effective, the Herringbone eliminator structure declines in performance as higher air velocities are encountered. Inclination and overlapping of the slats is correlated with the static air pressure drop to prevent an undesirable decrease in performance of the tower and in an effort to more effectively remove water droplets from the moist airstream. With increasing concern about the potential deleterious environmental effects of cooling tower drift, especially when brackish or saltwater is used as the cooling medium, a need has arisen for a more efficient drift eliminator than is inherent in the Herringbone, without significant cost increases or a decrease in thermal performance of the overall tower unit.

Another approach to drift eliminator is found in U.S. Pat. No. 3,065,587 which discloses honeycomb eliminators associated with horizontal wooden slats somewhat similar to the first pass of the Herringbone design. Further, in one specific embodiment disclosed in FIG. 9 of the drawings of this patent, the use of a pair of adjacent, coplanar, angularly disposed cellular honeycomb sections is taught. Although honeycomb eliminators have found substantial application, their principal usage has been limited for the most part to smaller package-type counterflow towers because of the problems associated with providing a pack of sufficient structural integrity in order to minimize the external supports needed to hold the eliminator in position across the moist air outlet face of the fill assembly without sagging, warping, or collapse of the cellular material.

U.S. Pat. No. 3,500,615 to Meek discloses the type of two-pass drift eliminator wherein separate eliminator packs are respectively composed of interconnected, alternating corrugated sheets, with the separate packs being located such that the corrugated sheets in each are at right angles relative to the sheets in the adjacent pack. Actual testing of this type of eliminator structure has demonstrated that it does not give adequate drift elimination, and that the pressure drops attributable to the unit are excessive. It is believed that a prime reason for the deficiency of this type of eliminator stems from the fact that no means is provided for separately draining the respective corrugated packs, and that accordingly the air passages thereof can become partially or fully blocked with water. The accumulated water is then very susceptible to becoming reentrained in the cooling air, thus further lessening the drift elimination properties of this type of eliminator construction.

It is therefore a primary object of the invention to provide dual pass cellular drift eliminator structures and methods for use in crossflow water cooling towers which overcomes many of the problems associated with drift eliminators used heretofore in commercial practice, and that are operable to remove a significantly higher portion of entrained water particles from high velocity moist airstreams leaving the fill assembly of a cooling tower without substantial increase in the overall cost of the eliminator assembly, or significant increase in the static air pressure drop associated with the use thereof.

A further important object of the invention is to provide two-pass drift eliminator structure and methods especially adapted for use with crossflow water cooling towers, and which are effective to remove entrained water particles from generally horizontally directed airstreams leaving the tower fill in a manner essentially independent of stream velocity through utilization of dual path eliminators having spaced, cellular, diversion path-defining structures disposed to first divert the airstreams upwardly and preferably laterally at an angle relative to the normal path thereof and to thereafter divert the streams laterally to one side of the first diversion path. In particular, a representative vector of the air approaching the eliminator, and a representative vector of the air during the first diversion thereof, establish a reference plane; and a representative vector of the air during the second diversion thereof is situated at an angle with respect to the established reference plane.

A still further important object of the invention is to provide a dual path drift eliminator of the type described wherein the first and second diversion path-defining cellular structures thereof are spaced a sufficient distance to permit separate drainage of the volumes of water collected in each section so that water blockage of the air inlet face of the drift eliminator structure is avoided to minimize accumulation and reentrainment of water in the air leaving the eliminator.

Yet another aim of the invention is to provide multicell dual path drift eliminator constructions which are configured to present nestable packs permitting complemental positioning of a plurality of the packs without creation of objectionable vertical gaps between the sections which could allow substantial volumes of entrained water to escape to the atmosphere.

A still further object of the invention is to provide a multicell dual path eliminator fabricated of rigidized preformed sheets preferably composed of neoprene asbestos and wherein the deformed surfaces thereof are configured and arranged so that the drift eliminator packs can be produced by stacking and gluing the preformed sections utilizing desirable assembly line techniques.

In the drawings:

FIG. 4 is another side elevational view of the drift eliminator pack depicted in FIGS. 2 and 3 and taken along line 4—4 of FIG. 3;

FIG. 6 is an essentially schematic, fragmentary end elevational view of a drift eliminator pack illustrating the water droplet removal operation thereof in a crossflow-type cooling tower;

FIG. 7 is an essentially schematic top plan view of a pair of nested eliminator packs and further showing the water droplet removal function thereof;

Figure 9:
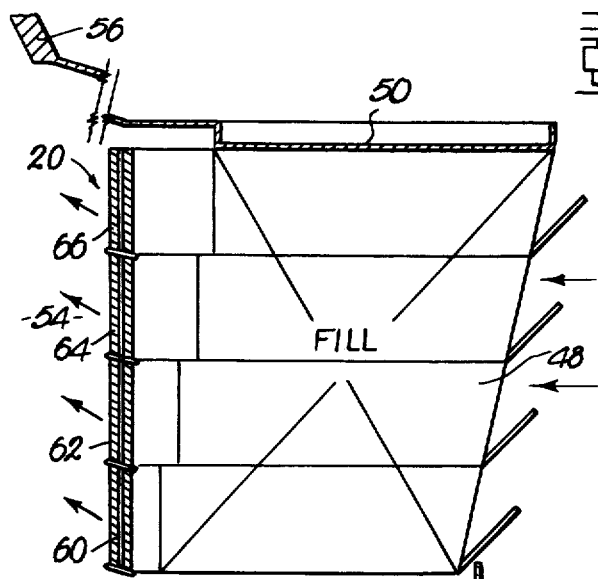
Figure 10:
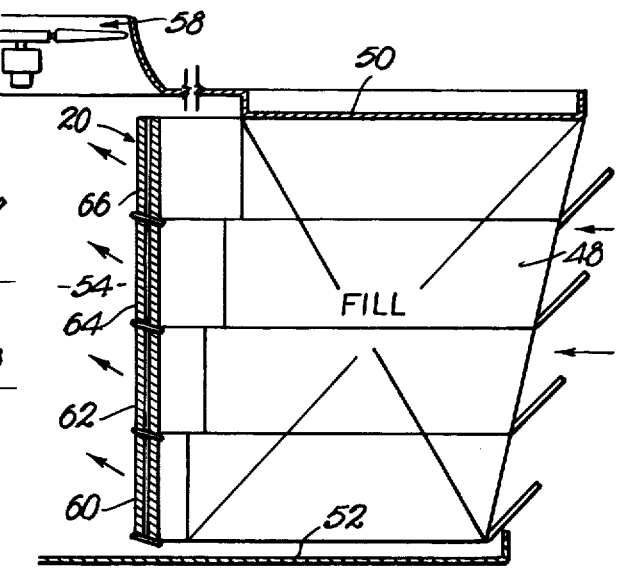
Figure 11:
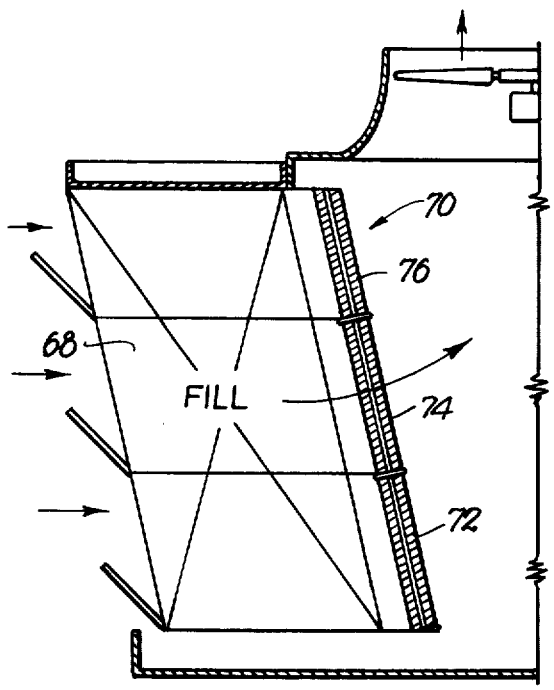
Figure 12:
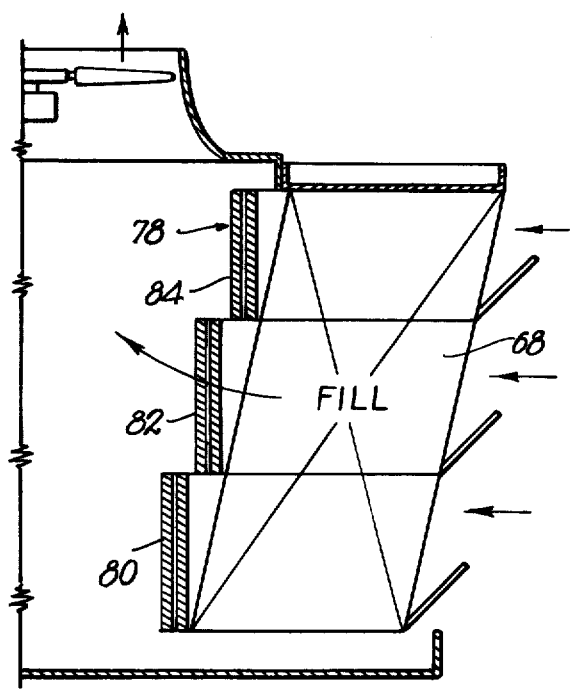

FIG. 8 is a graphical representation showing the enhanced drift elimination capabilities of the eliminator structures of the present invention, compared with a coplanar-type two-pass honeycomb drift eliminator depicted in U.S. Pat. No. 3,065,587;

FIG. 9 is an essentially schematic, fragmentary, vertical sectional view of a hyperbolic crossflow cooling tower shown with a plurality of multi-pack, vertically stacked eliminator sections positioned adjacent the exit face of the fill structure thereof;

FIG. 10 is an essentially schematic, fragmentary, vertical sectional view of a mechanical draft crossflow cooling tower with a plurality of multi-pack, vertically stacked eliminator sections positioned adjacent the exit face of the fill structure thereof;

FIG. 11 is an essentially schematic, fragmentary, vertical sectional view of a mechanical draft crossflow cooling tower, illustrating a plurality of vertically stacked eliminator sections in an inclined, complemental orientation relative to the exit face of the structure thereof; and FIG. 12 is a view identical with that shown in FIG. 11 except that the eliminator sections are in horizontally offset relationship with one another.

Figure 2:
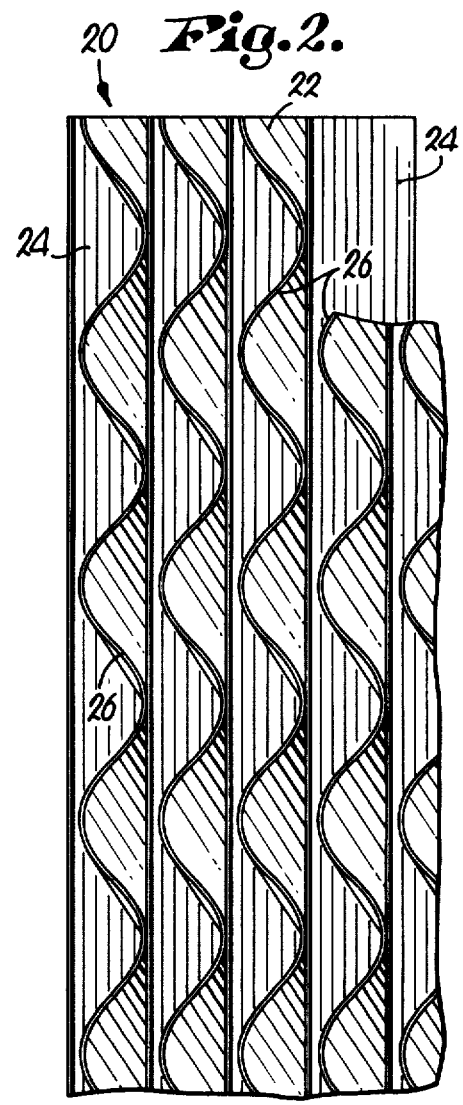
FIG. 2 is a fragmentary, side elevational view of the eliminator pack illustrated in FIG. 1.

Drift eliminator pack 20 incorporating the preferred concepts hereof is illustrated in FIGS. 1–4. In general, eliminator pack 20 comprises a plurality of side-by-side pairs of air passage-defining partition means preferably in the form of elongated, angularly corrugated segments 22, with the opposed segments of each pair being sandwiched between a pair of identical, preformed, imperforate, transversely V-shaped support panels 24. The latter present first and second generally planar sheets which are angularly oriented with respect to one another. The segment pairs and panels are positioned in alternating, adhesively secured, stacked relationship as best seen in FIG. 2 in order to define an elongated, multicell dual path eliminator pack.

Each segment 22 is an elongated, preformed member preferably composed of neoprene asbestos and having a plurality of aligned, side-by-side, generally sinusoidal, angularly disposed corrugations 26 along the length thereof. Similarly, each panel 24 is an integral member preferably formed of neoprene asbestos and presenting an included obtuse angle "X" (see FIG. 3). Although other materials such as vinyl can be used to form segments 22 and panels 24, neoprene asbestos is preferred from the standpoint of cost and ease of fabrication.

Figure 3:
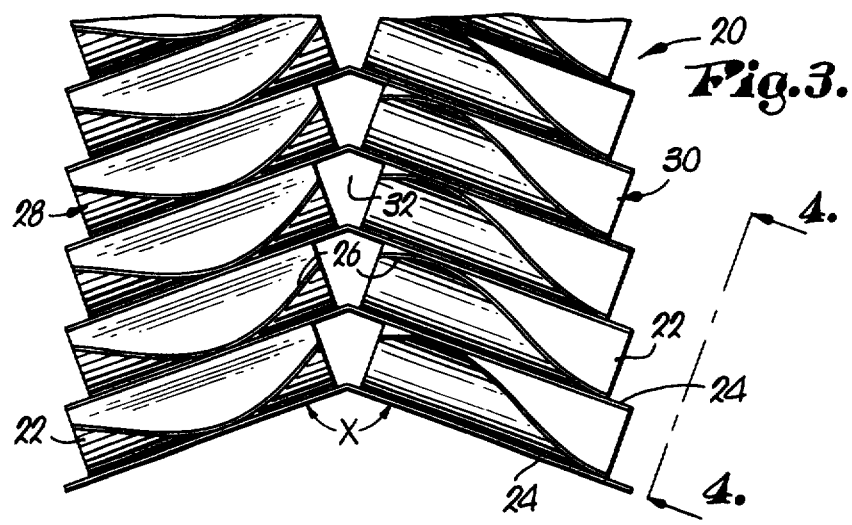
FIG. 3 is a fragmentary top plan view of the drift eliminator pack depicted in FIG. 2.

Referring specifically to FIG. 3, it will thus be seen that eliminator pack 20 presents a first cellular section 28 with a secondary, identically configured cellular section 30, laterally disposed with respect to section 28 and separated therefrom by a distance referred to by the numeral 32. The individual elongated cells within each cellular section 28 and 30 are defined by the individual corrugations 26 in the respective segments 22, as well as the adjacent support panels 24, as will be readily seen.

Figure 5:
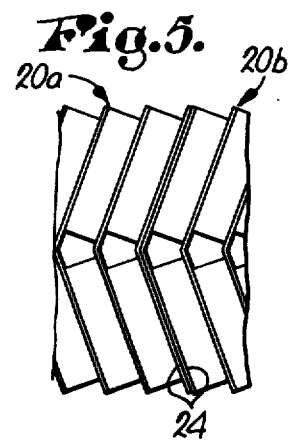
FIG. 5 is an essentially schematic, fragmentary top plan view of a pair of nestable drift eliminator packs, shown in complemental nested relationship.
Figure 1:
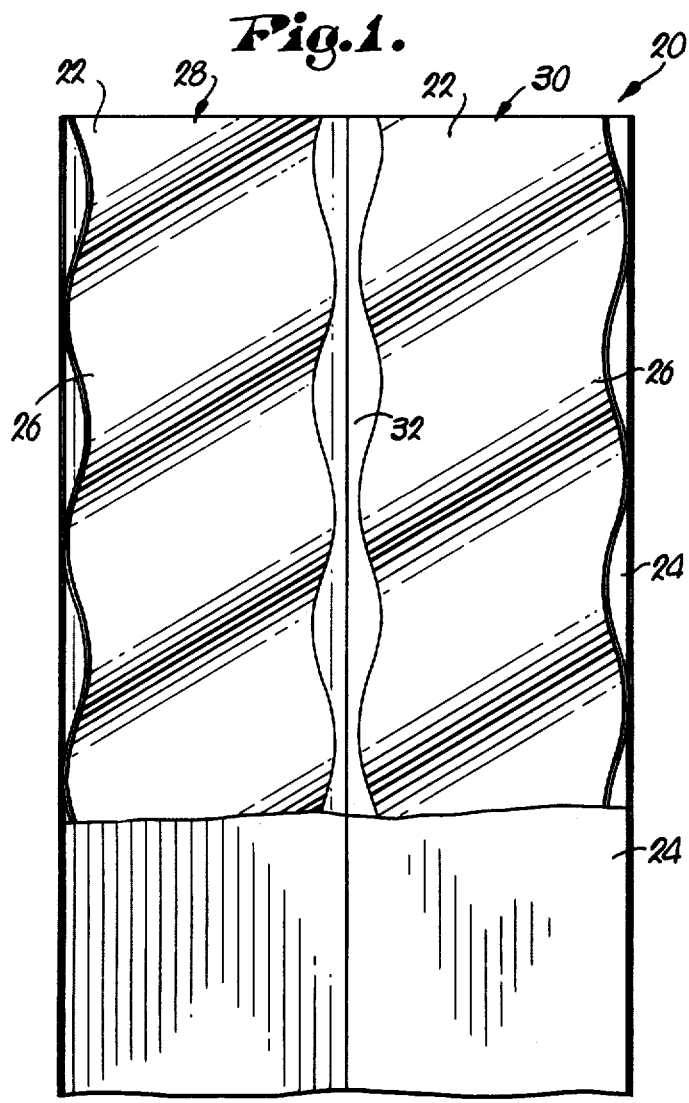
FIG. 1 is a fragmentary end elevational view of a dual path multicell eliminator pack and showing a pair of spaced, angularly corrugated neoprene asbestos sections secured to a transversely V-shaped support panel therefor.

The angular, generally V-shaped disposition of the support panels 24 permits complemental positioning of a number of eliminator packs 20 in aligned, end-to-end relationship as depicted in FIGS. 5 and 7. For example, a pair of eliminator packs 20a and 20b can be complementally and nestably positioned in an abutting manner without any objectionable vertical gaps along the joint therebetween. This permits rapid positioning of a plurality of adjacent eliminator packs 20 in complemental, juxtaposed, covering relationship to the air outlet face of cooling tower fill structure without the need of shiplap joints or other mechanical interconnection between the respective eliminator packs, as has been conventionally required.

Most important however, the configuration of the eliminator packs 20 is designed to present a dual path, individually draining, multicell unit that has proven to be extremely effective in removing entrained water particles from moist air-streams leaving the exit face of cooling tower fill structures. Referring to schematic FIGS. 6 and 7 wherein the water droplet removal operation of the present eliminator in a crossflow type tower is depicted, it will be seen that the moist air is initially directed against the air inlet face of first cellular section 28. By virtue of the fact that the individual cells thereof are inclined upwardly relative to the initial path of air, the air is first diverted along the inclined path thereof in passage therethrough.

Upon leaving the cells of first cellular section 28, the moist airstream next passes through the laterally oriented, upwardly inclined cells of secondary cellular section 20. It is important that the secondary air diversion path defined by cellular section 30 is situated to one side of the first diversion path presented by section 28 in order to enhance the water removal capabilities of the overall eliminator. Actual test results have proven that this relative disposition of the respective cellular sections has the effect of dramatically increasing the effectiveness of the eliminator.

In order to more precisely describe the relative orientation of diversion path defining sections 28 and 30 relative to the initial path of moist air, the following is helpful. For ease of discussion, the initial path and magnitude of such moist air can be thought of as a representative single vector 38. Upon entering section 28, the air represented by vector 38 is diverted along a first diversion path represented by vector 40 which is situated at an angle relative to vector 38. Vectors 38 and 40 also establish a reference plane which may be essentially vertical or at any one of a number of angles with respect to the vertical. The moist air next enters section 30 and is rediverted along a second diversion path represented by vector 42. As best seen in FIG. 7, vector 42 is situated at an angle with respect to the reference plane established by vectors 38 and 40.

It will thus be seen that the preferred eliminator structure hereof is operable to divert the initial moist air path first upwardly and laterally and then laterally again so that the moist air is varied in a number of directions during travel thereof through the eliminator. In any event, such a dual path structure defined by the relative disposition of the cellular sections making up the eliminator has been proven to dramatically increase drift elimination.

As discussed, the individual cells defining first cellular section 28 should be oriented at an upwardly inclined angle relative to the initial path of moist air in order to initially direct the moist airstreams therethrough. In more definitive terms, this angle should broadly vary between about 10° to 60° relative to the horizontal in a crossflow tower application, more preferably from about 15° to 50°, and most preferably at an angle of about 30°.

It is also extremely desirable from the drift elimination standpoint to angularly orient the cells of secondary cellular section 30 with respect to the initial path of moist air, in addition to the lateral disposition thereof relative to the cells of cellular section 28. In this regard, the same inclination angles listed above in connection with the cells of section 28 can be used to good advantage in orienting the cells of section 30. This has the effect of directing the streams upwardly through the entire eliminator to facilitate discharge thereof from the tower. Moreover, this orientation minimizes the objectionable pressure drop across the eliminator.

During travel of moist air along the first and second air diversion paths defined by cellular sections 28 and 30, the inertia of the entrained water particles causes the latter to impinge against the defining cellular sidewalls of the sections. This in turn causes collection of the impinged water particles on such sidewalls and permits removal of water droplets by gravitational drainage, illustrated by arrows 44 and 46 in FIG. 7.

Such water drainage is greatly facilitated in the present eliminator by provision of the spacing 32 between cellular sections 28 and 30. By virtue of this spacing, the water collected in each individual section 28 and 30 can be separately drained to the cooling tower basin therebelow. This is advantageous because of the fact that large volumes of water, if drained only from the air entrance face of the eliminator, could cause water blockage of the inlet face which in turn increases the static air pressure drop across the eliminator and deleteriously effects the overall performance thereof. Thus, the spacing 32 between the cell sections is particularly preferred, especially when the eliminator 20 is to be utilized in the crossflow type of cooling tower where the eliminator packs are positioned in a generally upright orientation.

The eliminator packs of the present invention are usable in virtually all types of evaporative crossflow cooling towers. FIGS. 9-12 illustrate the use of the present eliminators in the context of annular crossflow cooling towers, which include circumscribing upright fill structure 48, an annular hot water delivery basin 50 thereabove, and a cold water collection basin 57 underlying the fill. Fill 48 defines a central plenum chamber 54 within the confines thereof, the latter being in communication with the air current-inducing apparatus associated with the overall tower. For example, in FIG. 9, an upright, natural draft-inducing hyperbolic stack 56 is fragmentarily depicted, and in FIG. 10, a mechanical draft-inducing fan assembly 58 is shown. Either of these expedients can be utilized for inducing crossflowing currents of air through fill structure 48 for evaporative cooling of hot water descending through the latter.

It will be seen that the annular eliminator structures utilized for drift elimination with relatively tall, annular crossflow fill structures are comprised of a series of vertically stacked and juxtaposed eliminator sections which are defined by a number of side-by-side, nested cellular eliminator packs 20. For example, four sections 60, 62, 64 and 66 are shown in FIGS. 9 and 10, and the latter cooperatively extend substantially the entire height of the respective fill structures 48 in proximal, complemental relationship with the air outlet faces thereof.

A mechanical draft crossflow cooling tower is also illustrated in FIG. 11 wherein conventional fill structure 68 is employed which is configured and arranged to compensate for water pull-back at the base of the fill. Eliminator structure 70 is inclined at substantially the same angle as the exit face of the fill and is comprised of a series of three inclined eliminator sections 72, 74 and 76. Thus, the overall eliminator 70 is complementally arranged with respect to the air outlet face of fill structure 68.

In other instances, it has proven to be beneficial to utilize an eliminator structure 78 as shown in FIG. 12 having horizontally offset, multi-pack eliminator sections positioned with the lowermost section situated at the innermost position, and all higher sections being horizontally offset outwardly therefrom. In this embodiment lowermost eliminator section 80 is situated at the innermost position with higher eliminator section 82 and 84 being horizontally offset with respect thereto.

Actual testing in practice has proven that the dual path drift eliminators hereof give dramatically enhanced water particle removal from moist airstreams, as compared with conventional units. It is believed that this stems from the use of first and second cellular structures operable to first divert the moist fill airstream into a first diversion path disposed at an angle relative to the normal path of the air, followed by a diversion along a second diversion path disposed to one side of the first diversion path. Such an irregular diversion of air through the eliminator maximizes the probability that the entrained water particles will impinge against the defining sidewalls of the eliminator cells and thus collect for drainage therefrom. Also, provision of separately draining first and cellular sections as explained is believed to materially assist in drift elimination because water accumulation and blockage of the air passages, and resultant re-entrainment of water droplets, is effectively avoided.

These enhanced operational characteristics will be readily apparent from a study of the graphical representation of FIG. 8. The latter represents a test conducted to determine the respective water removal capabilities of a 5 inch width, two-pass honeycomb drift eliminator similar to the type depicted in FIG. 9 of the drawings of U.S. Pat. No. 3,065,587, compared with a 5 inch width dual path drift eliminator in accordance with the present invention. The prior art eliminator uses coplanar, angularly disposed cellular sections. The drift elimination capabilities of the two-pass honeycomb were recorded as a function of the velocity of air leaving a crossflow cooling tower fill structure, and these results were arbitrarily taken to represent a 100% drift rate. The same test was also performed with the present dual path eliminator, and the results likewise plotted as a function of airstream velocity from the fill structure. As clearly shown in the graph, the drift elimination capabilities of the present eliminator structure are at least five times that of the two-pass honeycomb eliminator at substantially all airstream velocities. Thus, the beneficial results obtainable with the present eliminator structure are conclusively demonstrated.

In another series of tests the drift eliminator of the present invention was compared to two-pass structure of the type disclosed in U.S. Pat. No. 3,500,615. In particular, two separate packs of 3¼ inches thickness were used, with the packs being oriented at 90° relative to each other and placed in stacked, abutting relationship across the air exit face of a counterflow-type test cell (at 0° relative to the horizontal) specifically designed for measuring counterflow drift elimination. The alternating corrugated sheets in each pack had a corrugation pitch of 1.83 inches (measured in a plane perpendicular to the corrugation valleys), and a two-thirds inch peak-to-peak thickness. The efficiency in parts per million of entrained water to exit air was measured at air velocities of 400 and 550 ft./min., with a recirculating water load of 10 gallons per minute per square foot (based upon the area of the cell exit face).

As a corollary test, a drift eliminator in accordance with the present invention was measured in a similar crossflowtype test cell. The eliminator had a total width of 5 inches and was placed adjacent the air exit face of the test cell at an angle of 12¼ degrees relative to the vertical. The distance between the V-shaped members of the eliminator was two-thirds inches, and the effective drainage distance between the adjacent cellular sections was approximately ⅜ inch. The corrugations of the sheets between the V-shaped members was upwardly inclined at 60° relative to the eliminator face. This eliminator was tested at 400 to 550 ft./min. air velocities with a recirculating water load of 10 gallons per minute per square foot.

In both cases drift and pressure drop were separately measured to determine relative drift removal efficiencies. The following table summarizes these test results, wherein Test I is the eliminator of the type disclosed in U.S. Pat. No. 3,500,615, and Test II is the eliminator of the present invention. For ease of comparison, the drift and pressure drop results of Test I are taken as 100%, and those of Test II are expressed as percentages of this standard.

TABLE

| Test I | | | Test II | | |
| --- | --- | --- | --- | --- | --- |
| Air Velocity (ft/min) | Drift | Pressure Drop | Air Velocity (ft/min) | Drift | Pressure Drop |
| 400 | — | 100% | 400 | — | 75.8% |
| 550 | — | 100% | 550 | — | 74.3% |
| 400 | 100% | — | 400 | 26.3% | — |
| 500 | 100% | — | 500 | 23.4% | — |
| 600 | 100% | — | 600 | 26.3% | — |

The above data demonstrates that the eliminator hereof gives significantly greater drift elimination (a factor of about four times) at all air velocities tested; moreover, this is accomplished with a lesser pressure drop than that experienced with the two-pass eliminator of U.S. Pat. No. 3,500,615. Furthermore, since the latter eliminator was tested in a counterflow cell, the comparative results would be expected to be even more dramatic if this eliminator were used on a crossflow test cell. This stems from the known fact that counterflow eliminators have inherently better drainage by virtue of the orientation thereof, and that poor test results on a counterflow cell indicate that even worse results would be found in a crossflow test.

Although the reasons for the dramatic improvement of the eliminator of the present invention over the eliminator of U.S. Pat. No. 3,500,615 are not completely understood, it is hypothesized that lack of individual pack drainage in the latter unit is a primary cause. Also, the construction of this eliminator inherently provides a certain percentage of relatively unrestriced airflow channels for the moist air, as opposed to the positive upward and lateral air diversions provided by the eliminator hereof.

The eliminator constructions of the invention are also advantageous in that fabrication is a simple matter and amenable to production line techniques. In practice, an elongated, hollow form is provided for the production of the eliminator packs 20. An initially transversely V-shaped support panel 24 is first placed at the bottom of the form, and the upraised apex portions of a pair of corrugated segments 22 are coated with conventional heat-setting glue. The coated segments 22 are then positioned on the panel 24 in spaced, side-by-side relationship with one another. Alternately, a single, elongated corrugated member can be longitudinally cut and spread over the apex of the support panel after gluing. In this case the segments are connected by a thin strip of material but are identical in every other way with the separate pairs of segments. A second panel section 24 is then placed over the corrugated segments 22 and the glue coating and placement procedure repeated. This is continued until an eliminator pack having the desired number of cell-defining layers is built up in the form. At this point, the form is transferred to a heating over whereupon the heat-setting glue serves to bond the respective segments and panel sections into a completed eliminator pack. In this manner, fabrication costs are greatly reduced and unskilled workers can be employed in the production procedure.

Having thus described the invention, what is claimed as new and desired to be secured by Letters Patent is:

1. A method of removing entrained water particles from a moist airstream traveling along a generally horizontal initial path, comprising the steps of:

initially diverting said moist airstream upwardly relative to said initial path such that a vector representing travel of the moist air along said initial path, and a vector representing travel of the moist air during said upward and lateral diversion, cooperatively establish a reference plane, said diversion including the steps of moving said moist air into individual elongated first air cells located in parallel relationship and oriented for causing said upward diversion and defined by walls presenting said first air cells therebetween thereafter secondarily diverting moist air laterally relative to the path of the air from the first air cells such that a vector representing travel of the moist air during the second lateral diversion thereof is at an angle relative to said reference plane, said secondary diversion including the steps of moving said moist air from said first air cells into individual elongated second air cells spaced from the air cells disposed in parallel relationship and oriented for causing said second lateral diversion and defined by walls presenting said second air cells therebetween;

permitting the entrained water particles in said airstream to impinge against the walls defining said first and second air cells during said initial and secondary diversions airstream; and draining the water collected by virtue of said impingement by allowing at least a part of said water to gravitate between said first and second air cells along the space therebetween.

2. The method as set forth in claim 1 including the steps of initially directing said moist airstream both upwardly and laterally relative to said initial path.

3. The method as set forth in claim 1 including the step of separately draining the water collected in said first and second air passages respectively.

4. Drift eliminator structure adapted to be positioned adjacent the air exit face of the fill structure of a crossflow cooling tower for removing entrained water droplets from the moist air, leaving said fill structure, said drift eliminator structure comprising:

a plurality of horizontally spaced, elongated, generally upright, transversely V-shaped members such having first and second generally planar sheets oriented at an angle relative to each other;

partition means joined to and positioned between each opposed pair of adjacent sheets of proximal V-shaped members dividing the space therebetween into individual, elongated discrete cells located for passage of fill-derived moist air therethrough, the air cells between the first and second sheets respectively presenting corresponding side-by-side first and second eliminator sections, said side-by-side eliminator sections between respective pairs of V-shaped members being located in spaced relationship to one another to define therebetween generally upright water drainage passages for each cell respectively and extending generally from the top to the bottom of said drift eliminator for at least partial water drainage along respective drainage passages, the partition means presenting the air cells of said first eliminator section and the first sheets being located to define longitudinally parallel air cells for receiving air from said outlet face and oriented for diverting such air upwardly relative to the initial path of the air leaving said exit face such that a vector representing the travel of moist air along said initial path, and a vector representing the travel of moist air along the air passages of said first section, cooperatively establishing a reference plane, the partition means defining the air cells of said second eliminator section and the second sheets being located to define longitudinally parallel air passages for receiving air after flow thereof through said first eliminator section and oriented for diverting such air laterally relative to the path of air leaving said first eliminator section, such that a vector representing the travel of air along the air passages of said second section is at an angle relative to said reference plane.

5. In a crossflow cooling tower:

a hot water distributor;

a cold water collection basin beneath said distributor;

fill structure located between said basin and distributor for dispersing hot water gravitating from the latter;

means for directing ambient-derived air through said fill structure in crossflowing intersecting relationship to the flow of water therethrough for cooling of the latter;

two-pass, cellular drift eliminator structure positioned proximal to the air exit face of said fill structure for removing droplets of water entrained within the moist air leaving the fill structure, said eliminator structure comprising:

a plurality of horizontally spaced, elongated, generally upright, transversely V-shaped members each having first and second generally planar sheets oriented at an angle relative to each other;

partition means joined to and positioned between each opposed pair of adjacent first and second sheets of proximal V-shaped members dividing the space therebetween into individual, elongated discrete cells located for passage of fill-derived moist air therethrough, the air cells between the first and second sheets respectively presenting corresponding side-by-side first and second eliminator sections, said side-by-side eliminator sections between respective pairs of V-shaped members being located in spaced relationship to one another to define therebetween generally upright water drainage passages for each cell respectively and extending generally from the top to the bottom of said drift eliminator for at least partial drainage along respective drainage passages, the partition means presently the air cells of said first eliminator section and the first sheets being located to define longitudinally parallel air passages for receiving air from said outlet face and oriented for diverting such air upwardly relative to the initial path of the air leaving said exit face such that a vector representing the travel of moist air along said initial path, and a vector representing the travel of moist air along the air passages of said first section, cooperatively establish a reference plane, the partition means defining the air cells of said second eliminator section and the second sheets being located to define longitudinally parallel air passages for receiving air after flow thereof through said first eliminator section and oriented for diverting such air laterally relatively to the path of air leaving said first eliminator section, such that a vector representing the travel of air along the air passages of said second section is at an angle relative to said reference plane.

6. The cooling tower as set forth in claim 1 wherein the orientation of the air passages of said second section serves to divert air received from said first section upwardly.

7. The cooling tower as set forth in claim 6 wherein the air passages of said first and second sections are disposed at substantially equal angles relative to the initial path of moist air from said outlet face.

8. The cooling tower as set forth in claim 1 wherein the disposition of the air passages in said first section serves to divert said air from said outlet face both upwardly and laterally relative to the initial path of the air.

9. The cooling tower as set forth in claim 1 wherein said partition means is in the form of an elongated, preformed, generally sinusoidally corrugated sheet.

10. The cooling tower as set forth in claim 1 wherein said V-shaped members are substantially imperforate.

11. The cooling tower as set forth in claim 1 wherein said V-shaped members are configured to present an included obtuse angle.

12. The cooling tower as set forth in claim 1 wherein said V-shaped members and corrugated sections are formed of neoprene asbestos, and said segments are adhesively secured to said sheets.

13. The cooling tower as set forth in claim 1 wherein said air current-directing means comprises a hyperbolic, natural draft-inducing stack.

14. The cooling tower as set forth in claim 1 wherein said air current-directing means comprises a current-inducing powered fan.

15. The cooling tower as set forth in claim 1 wherein the air passages in said first and second cellular structures are oriented at an angle of from about 10° to 60° relative to the horizontal.

16. The cooling tower as set forth in claim 15 wherein said angle is from about 15° to 50°.

17. The cooling tower as set forth in claim 12 wherein said angle is about 30°.

18. The cooling tower as set forth in claim 1 wherein said drift eliminator is composed of a series of elongated, vertically stacked eliminator elements positioned adjacent the moist air outlet face of said fill structure, said stacked eliminator elements cooperatively extending substantially the entire height of said fill structure.

19. The combination of claim 18 wherein said vertically stacked eliminator sections are positioned in offset relationship to one another, with the lowermost eliminator section situated at the innermost position and all higher eliminator sections being offset outwardly therefrom.

* * * * *